UNITED STATES PATENT OFFICE.

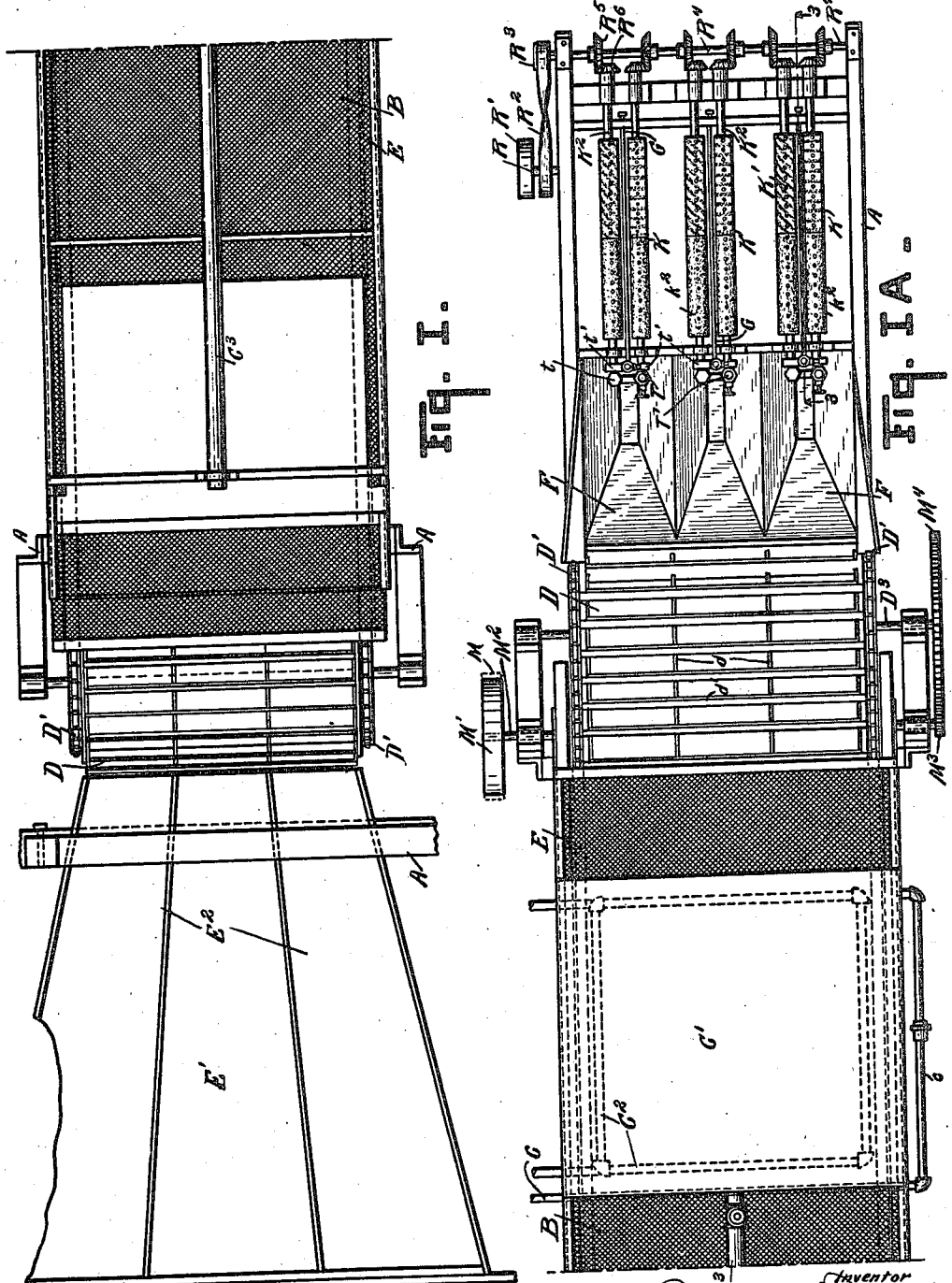

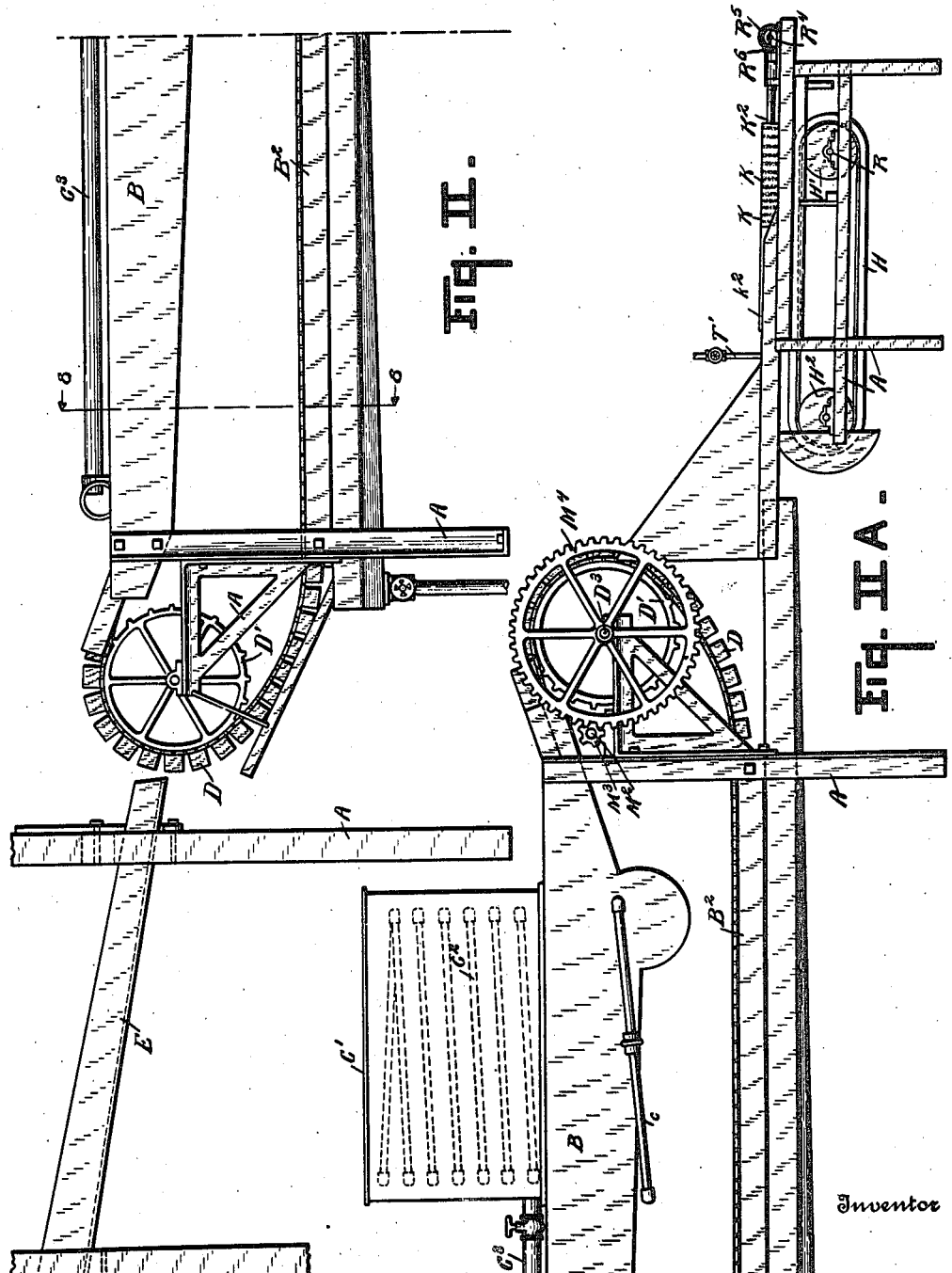

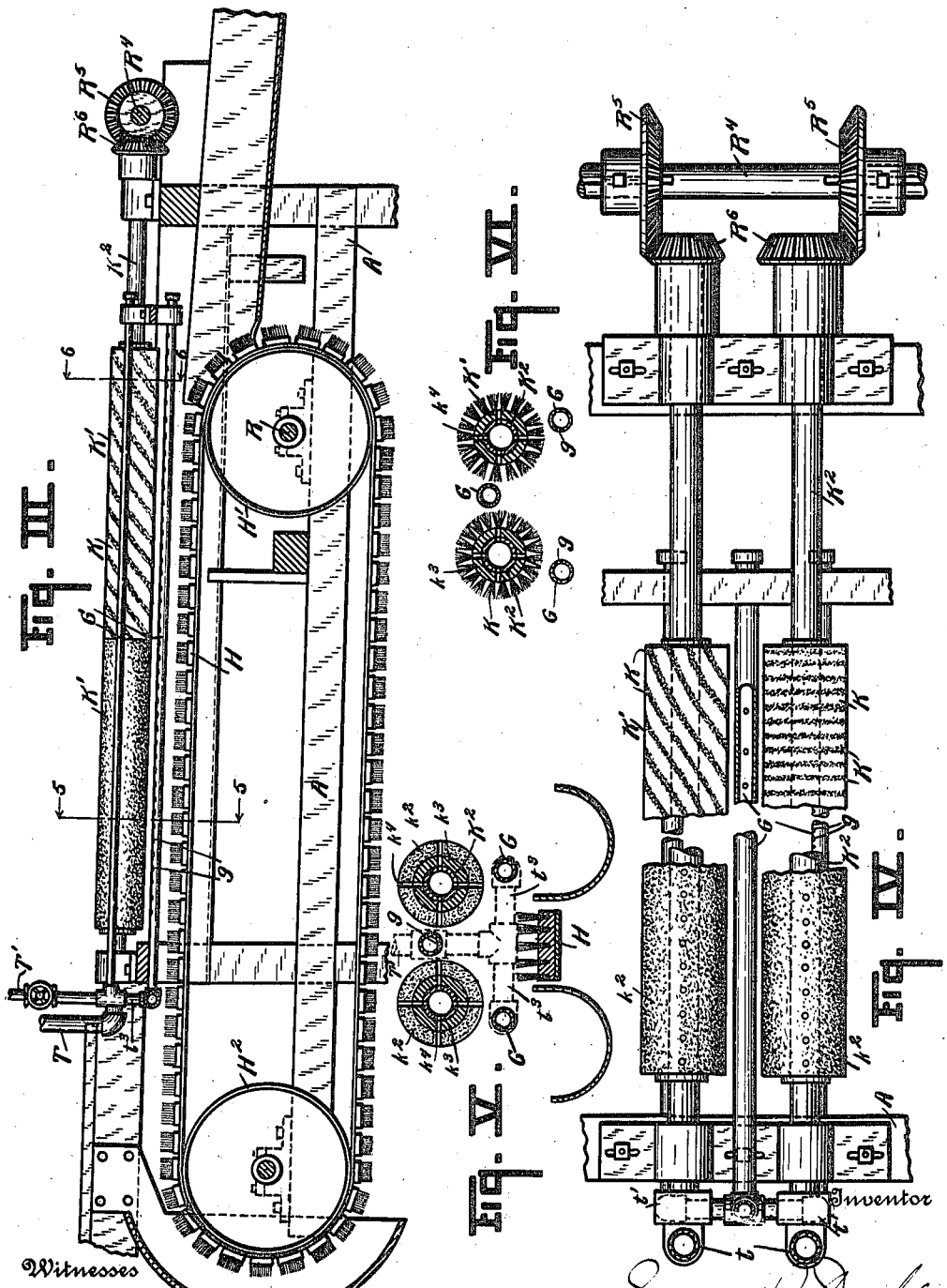

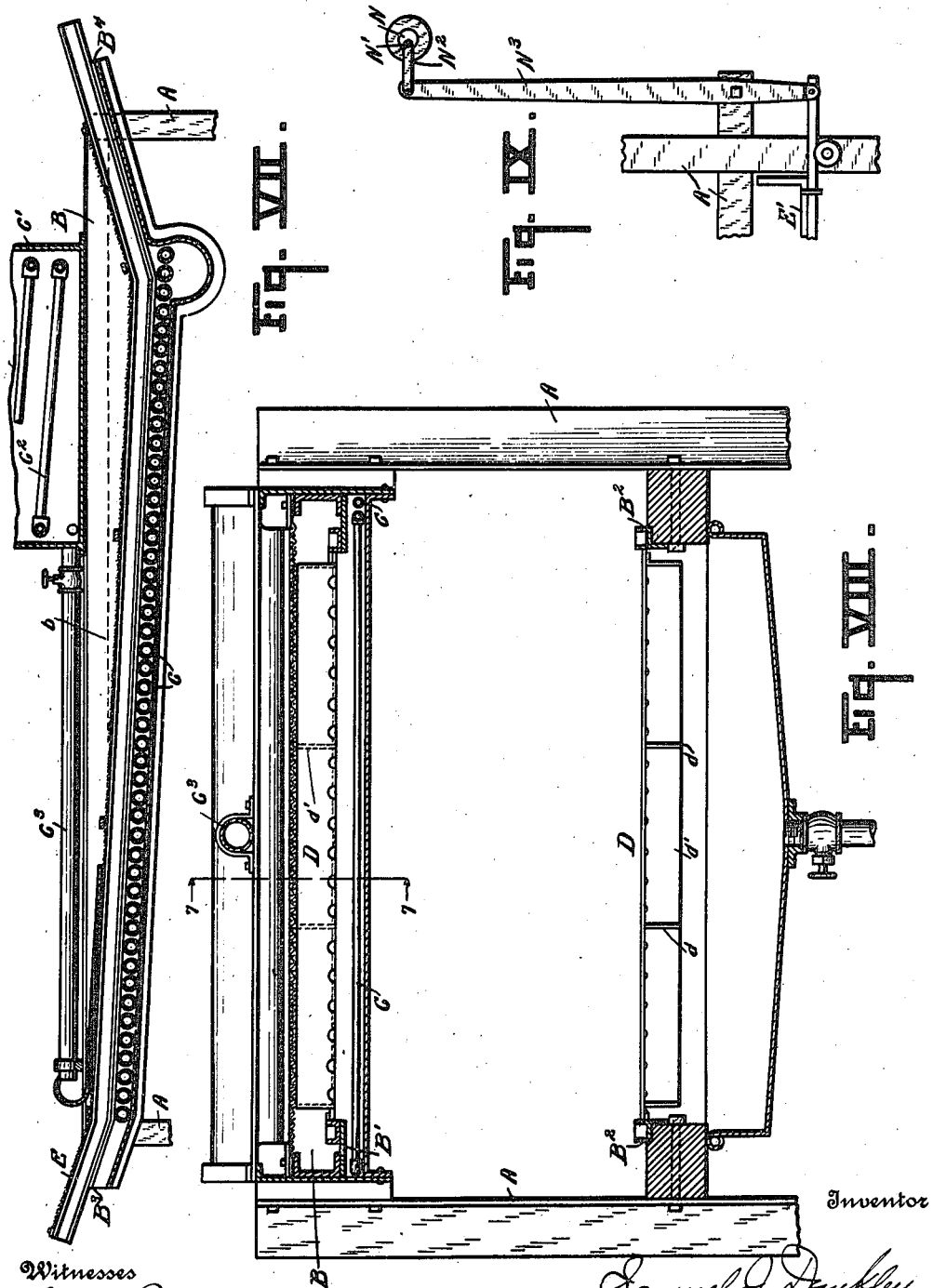

SAMUEL J. DUNKLEY, OF KALAMAZOO, MICHIGAN, ASSIGNOR, BY MESNE ASSIGNMENTS, TO DUNKLEY COMPANY, OF KALAMAZOO, MICHIGAN, A CORPORATION OF MICHIGAN.

PROCESS OF PEELING PEACHES OR OTHER FRUITS OR VEGETABLES.

1,237,623.  Specification of Letters Patent.  Patented Aug. 21, 1917.

Original application filed November 29, 1904, Serial No. 234,715. Patented July 21, 1914, No. 1,104,175.
Divided and this application filed June 25, 1914. Serial No. 847,275.

*To all whom it may concern:*

Be it known that I, SAMUEL J. DUNKLEY, a citizen of the United States, residing at Kalamazoo, in the county of Kalamazoo and State of Michigan, have invented certain new and useful Improvements in Processes of Peeling Peaches or Other Fruits or Vegetables, of which the following is a specification.

This invention relates to an improved process for peeling peaches or other fruit or vegetables.

The object of this invention is to provide an improved process by means of which peaches or other fruit or vegetables may be peeled very rapidly and easily and without injury to or abrasion or mutilation of the fruit or vegetables and by means of which the skin or peel may be removed without wasting the pulp or meat of the fruit or vegetable.

Further objects, and objects relating to details and economies of operation will definitely appear from the detailed description to follow.

I accomplish the objects of my invention by the devices and means described in the following specification. The invention is clearly defined and pointed out in the claims.

The machine or apparatus by means of which I carry out my improved process is illustrated in the accompanying drawing forming a part of this specification, in which:

Figures I and I$^A$ taken together, are a top plan view of a machine in which I carry out my improved process.

Figs. II and II$^A$ taken together, are a view in side elevation of the machine shown in Figs. I and I$^A$.

Fig. III is an enlarged detail sectional view on the line 3—3 of Fig. I$^A$, showing in detail the arrangement of the perforated pipes for delivering peeling jets and the brushes for rotating and advancing the fruit.

Fig. IV is a fragmentary top plan view, showing one set of perforated pipes for delivering peeling jets and one set of the brushes for rotating and advancing the fruit.

Fig. V is an enlarged detail cross sectional view on the line 5—5 of Fig. III.

Fig. VI is a detail sectional view on the line 6—6 of Fig. III.

Fig. VII is a detail longitudinal sectional view through the tank, the conveyer being omitted, on the line 7—7 of Fig. VIII.

Fig. VIII is a transverse detail sectional view through the tank on the line 8—8 of Fig. II.

Fig. IX is a detail elevational view of the mechanism for shaking the chute or hopper.

In the drawing, all of the sectional views are taken looking in the direction of the little arrows at the ends of the section lines, and similar reference characters refer to similar parts throughout the several views.

In the drawing, A represents the frame of the machine, and B is a tank or chamber containing a heated fluid $b$ for disintegrating, loosening or shriveling the skins of the specimens of fruit or vegetables as they are conveyed through the tank. The skin disintegrating fluid in the tank or chamber B may be composed of a water solution of some alkaline material. C is a heater for heating the skin loosening or disintegrating medium $b$, consisting of steam pipes or coils in the bottom of the tank B and connected with a steam supply pipe $c$. The skin loosening or disintegrating liquid is contained in a reservoir C$^1$ having a heater C$^2$ and is delivered to the tank B as required, through a supply pipe C$^3$. D is a conveyer which carries the specimens of fruit or vegetables into, through and out of the skin loosening and disintegrating liquid $b$ in the tank B. This conveyer or carrier D consists of an endless conveyer traveling on pulleys D$^1$, D$^1$ provided at each end of the tank B and said conveyer is provided with transverse webs $d$ and longitudinal webs $d^1$ dividing it into a series of buckets or receptacles adapted to hold several specimens, say six or eight, in a transverse row and adapted to automatically arrange the specimens in a single layer therein so as to cause them to be uniformly subjected to the action of the skin disintegrating fluid.

The tank B is provided with guides or tracks B$^1$, B$^2$ for guiding and supporting the endless conveyer D. The upper guide B$^1$ has a downward incline B$^3$ at the entrance end of the tank and an upward incline B$^4$ at the exit from the tank. E is an open screen of wire netting or of any other suitable material, secured to the tank B just above the path of the upper run of the endless conveyer D to hold the specimens in the open buckets or pockets of the conveyer and to prevent the same from floating to the top of the skin loosening or disintegrating liquid.

$E^1$ is a feed chute or hopper having partitions $E^2$ into which the specimens are emptied in bulk, and by which they are fed or delivered to the endless conveyer D. As the endless conveyer D passes over or around the pulley wheel $D^1$ at the exit end of the tank, the specimens are automatically delivered into the inclined and tapering chutes F, there being one of said chutes for each longitudinal partition of the conveyer, and the specimens are thus fed or delivered in single file between the water pipes and brushes of the peeling mechanism by which the loosened, disintegrated or shriveled skins are removed and the specimens are thoroughly washed and freed from all taint or trace of the skin disintegrating liquid.

This peeling mechanism comprises a group of three perforated water pipes G, having a series of perforations $g$ arranged to deliver jets of water striking the specimens as they are conveyed along between the pipes, and tending to impart to the specimens a rotary movement. The peeling mechanism further comprises an endless brush H, traveling on pulleys $H^1$, $H^2$ between the two lowermost water pipes G, G, by means of which the specimens are conveyed along in single file and at the same time are brushed somewhat as they are rotated. This peeling mechanism further comprises a pair of oppositely rotating cylindrical brushes K $K^1$, each of which has a hollow perforated water pipe $K^2$ for flooding the brushes with water as they rotate. The bristles or brushing material of the brushes K $K^1$ may be of any suitable material but I find it desirable to use vegetable fiber for this purpose. The bristles or brushing material on the cylindrical brush $K^1$ are spirally disposed, and the two brushes K and $K^1$ are rotated at different speeds so as to turn or rotate the specimens as they are conveyed along between the brushes by the endless belt brush H. For a portion of their length the rotary brushes K $K^1$ are provided with soft rubber sponge brushing material $k^2$, the back or base web $k^3$ of which is provided with perforations $k^4$ to flood the rubber sponge material with water from the pipe $K^2$. If desired, this rubber sponge material $k^2$ may be used for the entire length of the brushes K $K^1$, although I prefer to employ a bristle-like brushing material for a portion of the length of these rotary brushes. In practice for firm meated fruit or vegetables, the use of fiber brushes for the entire length has been found highly satisfactory and is the most economical. The perforated water pipes G G G, extend beyond the rotary brushes K $K^1$, so that the sprays or jets may entirely free the surface of the specimens from any particles of skin or peel.

The required movements may be imparted to the several moving parts of my machine by any suitable means or mechanism. The endless conveyer D is preferably driven continuously and at a slow speed, timed to subject the specimens to the action of the hot skin disintegrating liquid $b$ just for the time required to disintegrate and loosen the peel of the specimen without softening or cooking the pulp beneath the skin to an appreciable depth or extent, by means of a belt M and driving pulley $M^1$ on the driving shaft $M^2$ and gears $M^3$ $M^4$, the gear $M^4$ being on the shaft $D^3$ which carries the rear sprocket wheels $D^1$. The feed chute or hopper E is given a horizontal shaking or vibratory movement from the shaft N through the crank $N^1$, pitman $N^2$ and lever $N^3$. This shaking means is not needed for round fruit or vegetables. The several endless belt brushes H are driven continuously from the driving shaft R through the pulley $R^1$, the pulleys $H^1$ of the belt brushes at one end being on the shaft R. Continuous rotary motion is communicated to the rotary brushes K $K^1$ from the driving shaft R through a twisted belt $R^2$ and pulley $R^3$ on the shaft $R^4$, having beveled gears $R^5$ meshing with the bevel gears $R^6$ on the hollow water pipe $K^2$ of the rotary brushes. Water under pressure is supplied to the hollow shafts of the several rotary brushes from the supply pipe T, having branches $t$ leading to each of the rotary brushes, and connected to its hollow core or shaft by stuffing boxes $t^1$. The water supply pipe $T^1$ also has branches $t^3$ leading to the perforated water pipes G. With higher pressures smaller jet openings may be used in the pipes G and thus the quantity of water may be reduced.

The first step of my improved process consists in disintegrating, loosening or shriveling the skins of the specimens of fruit or vegetables which are to be peeled. In the machine which I have here shown and described this is accomplished by passing the specimens through an alkaline solution which has the effect of disintegrating and loosening the skins or peels so that they may be very easily removed by the subsequent treatment. In order to render the water peeling means available the skins must be suitably disintegrated or loosened. The particular alkaline treatment which I have here described is highly effective to accomplish this, but I am sure that this disintegration or loosening may be accomplished otherwise and clearly, when the skin of the fruit or vegetable is disintegrated, the peeling jets will do the work of peeling the fruit or vegetable. After having been subjected to the influence and action of the skin disintegrating or loosening medium, or means, the specimens of fruit or vegetables are advanced by means of the carrier H between the rotary brushes K and K¹. As the specimens of fruit or vegetables are rotated by these means peeling water jets are directed upon them from the perforated water pipes G. The peel is removed from the specimens partly by means of the peeling jets delivered from the perforated water pipes G and partly by means of the brushing action of the rotary brushes K and K¹ which rotate and advance the fruit. The presence of these brushes is highly desirable as they aid in rotating the fruit and brushing the same to remove a portion of the skin therefrom. However, I have found that this is not necessary but that the peeling jets alone effectively remove the disintegrated and loosened skins, provided that the peeling jets are so directed as to play upon all sides of the fruit. The brushes may be omitted, although they are desirable.

The process which I have here described is especially adapted for peeling peaches but may also be used for peeling fruit or vegetables without change.

This application is a division of my application, Serial No. 234,715, filed November 29th, 1904.

I am aware that the particular steps of my improved process which I have here described are susceptible of considerable variation without departing from the spirit of my invention, and, therefore, I do not wish to be restricted to the same. Certain of these steps may also be omitted without departing from the spirit of my invention. I have found, however, that it is desirable to carry out the process as described, and, therefore, I desire to claim the same specifically, as well as broadly, as indicated by my appended claims.

Having thus described my invention, what I claim as new and desire to secure by Letters Patent, is:

1. The process of peeling fruits and vegetables consisting in subjecting the specimens thereof to the action of a skin loosening and disintegrating solution for a uniform period of time, advancing said specimens, rotating, brushing, and directing peeling jets upon said specimens, substantially as specified.

2. The process of peeling fruits and vegetables, consisting in loosening and disintegrating the skins of the specimens thereof, advancing said specimens, rotating, brushing, and directing peeling water jets upon said specimens as they advance, substantially as specified.

3. The process of peeling fruits and vegetables, consisting in disintegrating and loosening the skins of the specimens thereof, advancing said specimens, rotating and directing peeling water jets upon said specimens as they advance, substantially as specified.

4. The process of peeling fruits and vegetables, consisting in loosening and disintegrating the skins of the specimens thereof, advancing said specimens, and directing peeling water jets upon said specimens as they advance during a continuous operation, substantially as specified.

5. The process herein described of peeling fruits and vegetables which process consists in subjecting the fruit or vegetables to a bath of heated disintegrating solution for the purpose of loosening the skin thereof; and then passing the fruit into the range of action of hydraulic sprays of sufficient force to remove the loosened skin.

6. The process herein described of peeling fruits and vegetables which process consists in subjecting the fruit or vegetables to a bath of disintegrating solution for the purpose of loosening the skin thereof; and then passing the fruit into the range of action of hydraulic sprays of sufficient force to remove the loosened skin.

7. The process herein described of peeling fruits and vegetables which process consists in subjecting the fruit or vegetables to the action of a disintegrating solution having the capacity to loosen and disintegrate the skin thereof, and then subjecting the fruit or vegetable so treated to the action of fluid sprays and substantially coördinately therewith imparting motion to the fruit or vegetable.

In witness whereof, I have hereunto set my hand and seal in the presence of two witnesses.

SAMUEL J. DUNKLEY. [L. S.]

Witnesses:
   W. A. KINGSBURY,
   ABE VERHAGE.